United States Patent
Kitada et al.

(10) Patent No.: US 6,247,701 B1
(45) Date of Patent: Jun. 19, 2001

(54) MAGNET PROOF MAGNETIC FLUID SEALING DEVICE

(75) Inventors: Masakatsu Kitada, Oume; Yasuyuki Shimazaki, Hinohara-mura, both of (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 09/201,756

(22) Filed: Dec. 1, 1998

(30) Foreign Application Priority Data

Dec. 2, 1997 (JP) .................................................... 9-331352

(51) Int. Cl.[7] ........................................................ F16J 15/40
(52) U.S. Cl. .............................................................. 277/410
(58) Field of Search ............................................. 277/410

(56) References Cited

U.S. PATENT DOCUMENTS

| | | | |
|---|---|---|---|
| 4,526,380 | * 7/1985 | Raj et al. | 277/80 |
| 4,592,557 | * 6/1986 | Iversen | 277/410 |
| 5,593,164 | * 1/1997 | Mraz et al. | 277/9.5 |
| 5,954,342 | * 9/1999 | Mikhalev et al. | 277/410 |

* cited by examiner

Primary Examiner—Anthony Knight
Assistant Examiner—Mark Williams
(74) Attorney, Agent, or Firm—Antonelli, Terry, Stout & Kraus, LLP

(57) ABSTRACT

A magnetic fluid sealing device basically includes a housing; a rotating shaft rotatably supported in said housing by bearings; and a magnet and magnetic pole pieces, which are arranged in such a manner as to encircle said rotating shaft with micro gaps put therebetween. A magnetic field formed by magnet forms magnetic fluid films in the micro gaps to thereby magnetically seal high pressure/vacuum regions positioned at both ends of the rotating shaft. The sealing device is characterized in that the housing, and a mounting cap for fixing the magnetic fluid sealing portion and the bearings at specific positions in the housing are made of a magnetic material, and the materials of the housing and bearing and the dimension of the mounting cap are changed, to thereby reduce a leaked magnetic flux.

10 Claims, 6 Drawing Sheets

MAGNET PROOF MAGNETIC FLUID SEALING DEVICE

BACKGROUND OF THE INVENTION

1. Field of the Invention

The present invention relates to a magnet proof magnetic fluid sealing device, and particularly to a magnet proof magnetic fluid sealing device which is used, for example, as a bearing portion of a crystal lift apparatus for preparing the single crystal of a semiconductor material.

2. Description of the Prior Art

Recently, there have been strong demands toward the increase in diameter of a silicon single crystal prepared by a crystal lift apparatus. To meet these demands, for example, there has been reported a technique of controlling the convection of molten silicon by applying a magnetic field to the molten silicon, thereby adjusting the concentration of oxygen in the molten silicon. This technique is based on the fact that oxygen regarded as one of impurities to be contained in the silicon single crystal is eluted from quartz, an essential component of a crucible, kept at high temperatures and poured into the molten silicon, and then oxygen thus eluted travels on the surface of the growing single crystal by thermal convection and eventually it is diffused and absorbed in the single crystal.

Oxygen adsorbed on the surface of the single crystal is almost evaporated; however, in the case where rapid thermal convection occurs, oxygen is not perfectly evaporated and is possibly absorbed in the single crystal.

Meanwhile, in the molten silicon applied with a magnetic field, a current is induced to thereby suppress the degree of the thermal convection; however, if the degree of thermal convection is excessively suppressed, the molten silicon is undesirably filled with oxygen. Accordingly, the degree of thermal convection must be suitably controlled.

In this regard, there has been reported a method in which a magnetic field applied to the molten silicon is desired to be in a range of about 300 to 500 mT (mili-tesla) in order to solve the above-described problem, that is, to suitably control the degree of thermal convection.

In a magnetic fluid sealing device used as a bearing portion of a rotating feed-through device of the above crystal lift apparatus for preparing the silicon single crystal, the sealing is realized using a magnetic fluid magnetized by a magnetic field which is quite independent from the external magnetic field applied for controlling the convection of molten silicon.

The magnetic fluid sealing device used under the above circumstances may cause a problem that it no longer keeps the sealing characteristic by interference from a strong external magnetic field.

Referring to FIG. 4, there will be described a prior art magnetic fluid sealing unit.

FIG. 4 is a view illustrating an essential portion of a related art magnetic fluid sealing unit.

A magnetic fluid sealing unit 10a includes, as shown in FIG. 4, a shaft 3 made of a magnetic material, a permanent magnet 1, and a pair of magnetic pole pieces 2 disposed on both sides of the permanent magnet 1 in such a manner as to hold the permanent magnet 1 therebetween. The permanent magnet 1 and the magnetic pole pieces 2 encircle the shaft 3 with micro gaps δ put therebetween, so as to form a magnetic circuit. And, in the magnetic circuit, the micro gaps δ are filled with a magnetic fluid 5.

Referring to FIG. 5 there will be described in detail another prior art magnetic fluid sealing unit.

FIG. 5 is an enlarged view illustrating an essential portion of another prior art magnetic fluid sealing unit.

The magnetic fluid 5 in the micro gaps δ keeps the air-tightness of a vacuum region while withstanding a difference between a pressure in the vacuum region and a pressure which is substantially equal to atmospheric pressure is applied at each end of the shaft 3. The prior art magnetic fluid sealing device having such a function is, for example, used as a bearing portion of a rotating feed-through mechanism for introducing rotation to an enclosed chamber in a vacuum environment.

The magnetic sealing function of the magnetic fluid 5 is given by a magnetic field generated by the permanent magnets 1a, 1b as shown in FIG. 5. Accordingly, when being applied with an external large magnetic field different from the above magnetic field given by the permanent magnet 1a, 1b, the magnetic fluid sealing unit is largely affected by the external magnetic field.

When the magnetic fluid sealing unit having the magnetic circuit shown in FIG. 5 is applied with an external magnetic field of about 10 mT, it may lose the magnetic fluid sealing function and often cannot keep the necessary degree of vacuum. That is to say, the sealing unit shown in FIG. 5 does not keep its sealing function even when being applied with a very weak external magnetic field.

As shown in FIG. 5, a plurality of sets of permanent magnets 1a and 1b are arranged in such a manner that the permanent magnets 1a and 1b of each set are spaced from each other with the sides thereof having the same polarity opposed to each other; and a plurality of magnetic pole pieces 2a and 2b are alternately arranged in such a manner that each of the magnetic pole pieces 2a and 2b is placed between the associated set of the permanent magnets 1a and 1b, wherein magnetic poles of the same polarity are mutually faced in said associated set. Each of cavities $O_1$, $O_2$, ... is formed in the central portion of an end portion, on the shaft 3 side, of the associated one of the magnetic pole pieces 2a and 2b, and each of acute-angled peaks $P_1$, $P_2$, $P_3$, $P_4$, ... is formed on each of both the sides of the associated one of the magnetic pole pieces 2a and 2b. In each of the magnetic pole pieces 2a and 2b, a magnetic flux is divided into two components. The divided components of the magnetic flux which have the same polarity repel one another and are spread toward both side ends of the magnetic pole piece, respectively. In this way, in the case of the magnetic pole piece 2b, for example, there is formed a closed loop of the magnetic flux passing through the peaks P3 and P4.

Accordingly, there is formed a magnetic field distribution in which magnetic fluxes are extremely acutely concentrated on the surface of the shaft 3. With such a magnetic field distribution, the magnetic fluid 5 is significantly strongly held. It is confirmed that the magnetic fluid sealing unit in which the magnetic fields for holding the magnetic fluid 5 are strong as described above is allowed to keep the above sealing function even if an external magnetic field of about 300 mT is applied to the sealing unit in the direction where the external magnetic field directly interferes with the magnetic circuit of the sealing unit. In this way, it is proved that the magnetic fluid sealing unit shown in FIG. 5 in which sets of the magnets are arranged such that each set is arranged with the sides thereof having the same polarity opposed to each other exhibits a good sealing function.

However, when an external magnetic field as strong as 300 mT or more is applied to the prior art magnetic fluid sealing unit shown in FIG. 5, the sealing unit is affected by the external magnetic field and is made difficult to keep its sealing function."

Referring to FIG. 6, there will be described a magnetic fluid sealing device for a rotating machine, which uses the magnetic fluid sealing unit shown in FIG. 5. FIG. 6 is a view illustrating the magnetic fluid sealing device for a rotating machine, which uses the magnetic fluid sealing unit shown in FIG. 5.

A magnetic fluid sealing device 50 includes a case 20 for accommodating the entire magnetic fluid sealing unit; and a shaft 3, made of a magnetic material, for transmitting rotational motion from one end 3b (atmospheric pressure side) to the other end 3a (vacuum side), which shaft is inserted into the case 20. In the cavity of the case 20 is arranged a magnetic circuit of the magnetic fluid sealing unit 10 encircling the shaft 3 inserted into the case 20; bearings 6a and 6b, arranged at both the ends of the case 20 which supports the shaft 3; an d fixtures (hereinafter, referred to as "snap rings") 7, mounted to the bearings 6a and 6b, for fixing the bearings 6a and 6b to the shaft 3 at specific positions.

After the magnetic circuit of the magnetic fluid sealing unit 10 and the like are provided in the cavity of the case 20, a screw cap 11 for fixing the magnetic circuit and the like at a specific position in the case 20 is provided at one end of the case 20 to be screwed into a screw portion 14.

In the following description of the magnetic fluid sealing device shown in FIG. 6, the one end 3a of the shaft 3 is taken as the vacuum environment and the other end 3b is taken as the atmospheric pressure environment.

When high vacuum and high cleanliness are required for the vacuum environment side, the arrangement order of bearing-magnetic circuit-bearing shown in FIG. 6 may be changed so as not to put parts on the vacuum side as much as possible.

Each of the bearings 6a and 6b for supporting the shaft 3 and the snap rings 7 for fixing the bearings 6a and 6b to the shaft 3 is made of a quenched ferromagnetic material such as a spring steel for ensuring a strength against an elastic force. In the magnetic field, these members are magnetized, possibly into magnets. Such magnetization presents a problem in terms of sealing function.

Next, there will be described an experiment in which the above magnetic fluid sealing device 50 is located in an external magnetic source composed of a large-sized electric magnet device. FIG. 7 is a view illustrating an experiment for examining the sealing function of the magnetic fluid sealing device shown in FIG. 6.

As shown in FIG. 7, the magnetic fluid sealing device 50 was arranged in a magnetic field (M.F) generated by a strong electric magnet 100 in the direction that the axis direction of the shaft 3 of the magnetic fluid sealing device 50 perpendicularly matches with the direction of the magnetic field (M.F). Since the magnetic field (M.F) is parallel to the internal magnetic field generated by the magnets in the gap portion of the sealing device 50, there occurs large mutual interference. In this experiment, when the external magnetic field of 300 mT or more was applied to the sealing device 50, the sealing effect of the magnetic fluid sealing device 50 was lost.

The loss in the sealing effect of the magnetic fluid sealing device 50 will be described in detail with reference to FIG. 8.

FIG. 8 is an exploded view of an essential portion of the magnetic fluid sealing device shown in FIG. 6.

In FIG. 8, there occurred a leakage of vacuum in the vicinity of an acute micro gap g of the snap ring 7 for fixing the bearing 6 on the vacuum side, and a leaked magnetic fluid 5a was found thereat. This is caused by a usual pressure exerted to the magnetic fluid shown by the arrow D in FIG. 8.

The above-described experiment was repeated except that the material of the case 20 was changed into a magnetic material. As a result, it was revealed that the bearing 6 was magnetized into a strong magnet, which attracted the magnetic fluid 5 in the micro gap g, so that a force was exerted in the direction opposed to the usual pressure direction D and a magnetic fluid 5b entered the magnetic pole piece 2 on the atmospheric air side.

To prevent such an inconvenience, there has been adopted a structure in which the magnetic fluid sealing device is located far from the external magnetic field in order to prevent the magnetic fluid sealing device from being affected by the external magnetic field.

Also there has been adopted a magnetic shield mechanism making use of a property of the magnetic material sufficiently allowing a magnetic flux to pass therethrough.

Referring to FIG. 10, there will be described a method of making use of such magnetic shield mechanism.

FIG. 10 is a view illustrating a magnetic fluid sealing device 50 using the magnetic shield mechanism expected to use according to conventional arts. As shown in FIG. 10, a magnetic fluid sealing device is surrounded by a magnetic material made cylindrical member 16, and the magnetic fluid sealing device 50 is subjected to vacuum exhaust in a magnetic field. The magnetic fluid sealing device 50 was measured in terms of the leakage of the perpendicular magnetic flux as shown in FIG. 7, during vacuum exhaust. As a result, it was revealed that the sealing device 50 surrounded by the magnetic material made cylindrical member 16 which serves as a magnetic shield, having a thickness of at least 3 mm more kept a sealing function even when an external magnetic field of 300 mT or more was applied to the sealing device 50; however, the sealing device 50 surrounded by the magnetic material made cylindrical member 16 having a thickness of 3 mm or less lost the sealing function when an external magnetic field of 300 mT or less was applied to the sealing device 50.

The above effective magnetic shield mechanism, however, has a problem. That is to say, the increased thickness of the magnetic material made cylindrical member 16 increases the size of the magnetic fluid sealing device 50, to thereby require a large space to mount the sealing device 50. To solve the problem, the prior art magnetic fluid sealing device has been inevitably designed to locate the magnetic fluid sealing unit as far from an external magnetic field as possible.

SUMMARY OF THE INVENTION

An object of the present invention is to provide a magnetic fluid sealing device used in a strong magnetic field, which is intended to reduce a leaked magnetic flux and prevent scattering of a magnetic fluid and hence to improve the magnet proof characteristic by changing the materials of a case and a bearing and slightly enlarging the thickness of a screw cap without increasing the outside diameter.

To achieve the above object, the present invention makes use of a magnetic material as the case and the cap for enclosing the magnetic fluid sealing unit. Referring to FIG. 9, the basic principle of the magnetic shielding mechanism of the invention will be described. In FIG. 9, the magnetic shield mechanism makes use of the principle known in the electromagnetics in which when an internal cavity G is formed in a magnetic material (M.M) and an object is put into the cavity G, an external magnetic flux (M.FL) is not leaked into the cavity G. According to an aspect of the present invention, there is provided a magnet proof magnetic fluid sealing device basically including: a housing; a rotating shaft rotatably supported, in said housing, by bearings; and a magnet and magnetic pole pieces, which are arranged in such a manner as to encircle said rotating shaft with micro gaps put therebetween; wherein a magnetic field formed by said magnet forms magnetic fluid films in said micro gaps to thereby magnetically seal a region between a vacuum region at one end of said rotating shaft and a high pressure region at the other end of said rotating shaft. The magnet proof magnetic fluid sealing device is characterized in that the housing, and a mounting cap for fixing said magnetic fluid sealing portion and said bearings at specific positions in said housing are made from a magnetic material. Preferably, air gaps are provided in contact portions between said housing and end portions, on the opposed side to said shaft, of said magnetic pole pieces; a flange portion is provided on said mounting cap in such a manner as to extend in the direction perpendicular to the direction of an external magnetic field; said bearing and a fixture for locking said bearing are each made from a non-magnetic material; and a side wall, opposing to the side on which said mounting cap is locked, of said housing is thickened to make small the magnetic resistance thereof.

More concretely, the magnet proof magnetic fluid sealing device of the present invention basically includes a housing; a rotating shaft rotatably supported, in said housing, by bearings; and a magnet and magnetic pole pieces, which are arranged in such a manner as to encircle said rotating shaft with micro gaps put therebetween. A magnetic field formed by said magnet forms magnetic fluid films in said micro gaps to thereby magnetically seal a region between a high pressure region at one end of the rotating shaft and a vacuum region at the other end of the rotating shaft. Further, in the sealing device, the dimensions and materials of a mounting cap for fixing, in the housing, the magnetic fluid sealing portion and the bearings at specific positions, the housing, and the bearings are suitably changed to lower leakage of magnetic flux.

DETAILED DESCRIPTION OF THE PREFERRED EMBODIMENTS

Figure 1:
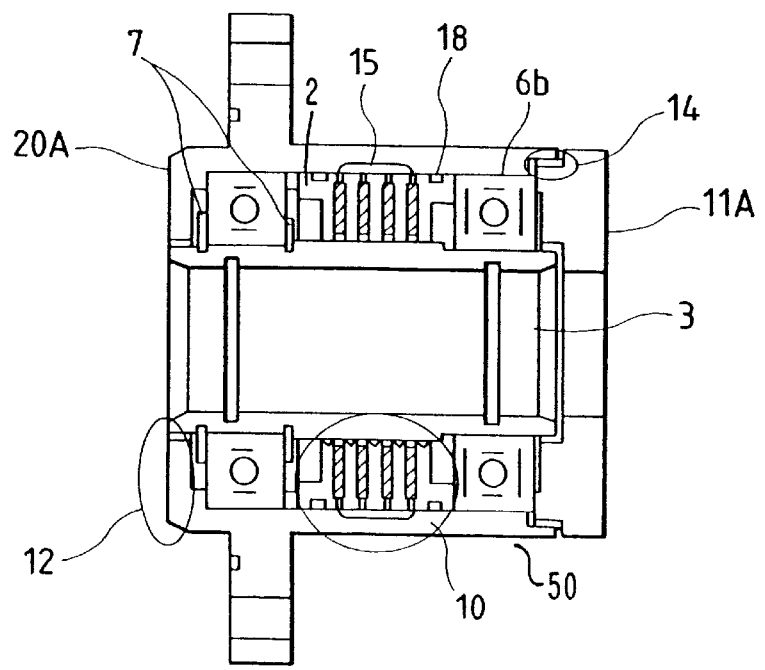
FIG. 1 is a view illustrating one embodiment of a magnet proof magnetic fluid sealing device of the present invention.
Figure 2:
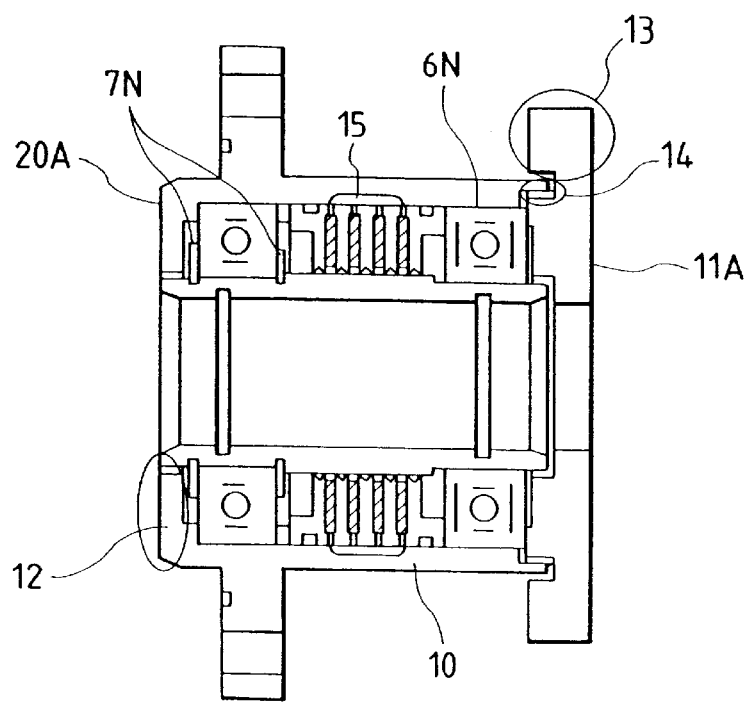
FIG. 2 is a view illustrating another embodiment of the magnet proof magnetic fluid sealing device of the present invention.

Hereinafter, preferred embodiments of a magnet proof magnetic fluid sealing device of the present invention will be described with reference to FIGS. 1 and 2. FIG. 1 is a view illustrating a first embodiment of the magnet proof magnetic fluid sealing device of the present invention and FIG. 2 is a view illustrating a second embodiment of the magnet proof magnetic fluid sealing device of the present invention. In addition, FIG. 3 is a view illustrating a prior art magnetic fluid sealing device.

The first embodiment of the magnetic fluid sealing device of the present invention shown in FIG. 1 will be described in comparison with the prior art magnetic fluid sealing device shown in FIG. 3. In these figures, the left side is taken as a vacuum environment V side and the right side is taken as an atmospheric pressure environment A side.

Figure 3:
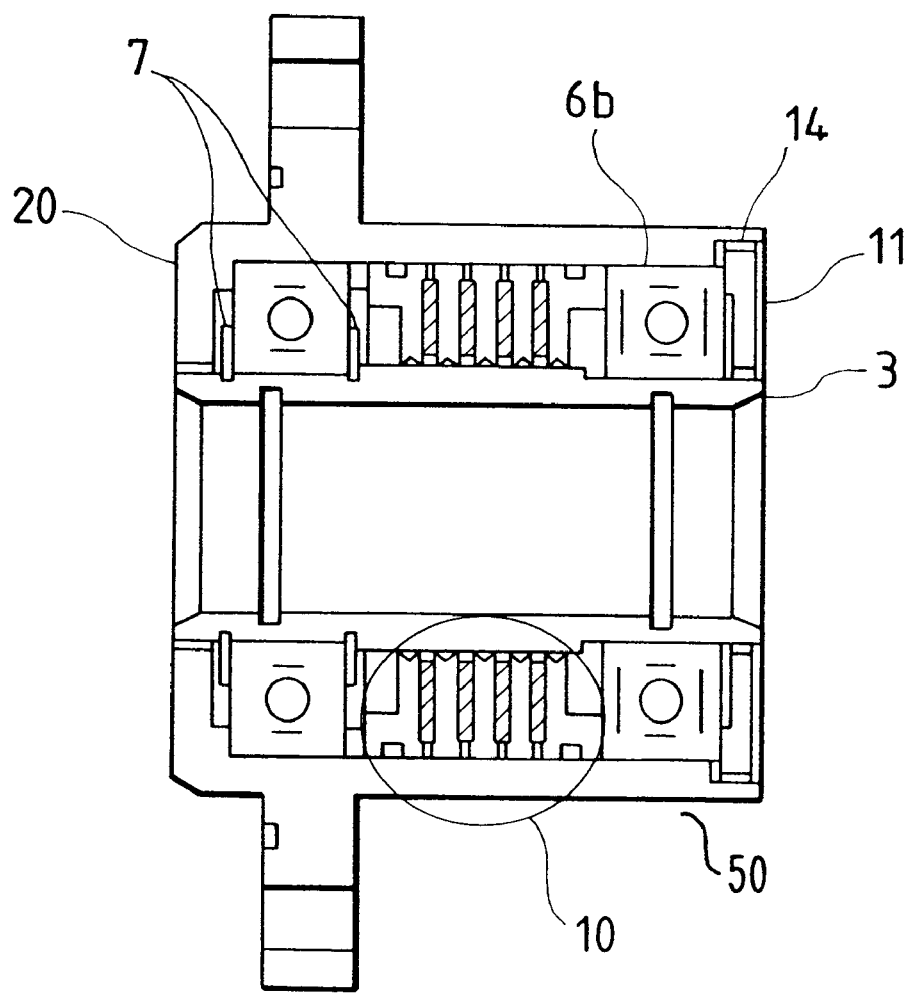
FIG. 3 is a view illustrating a prior art magnetic fluid sealing device.
Figure 4:
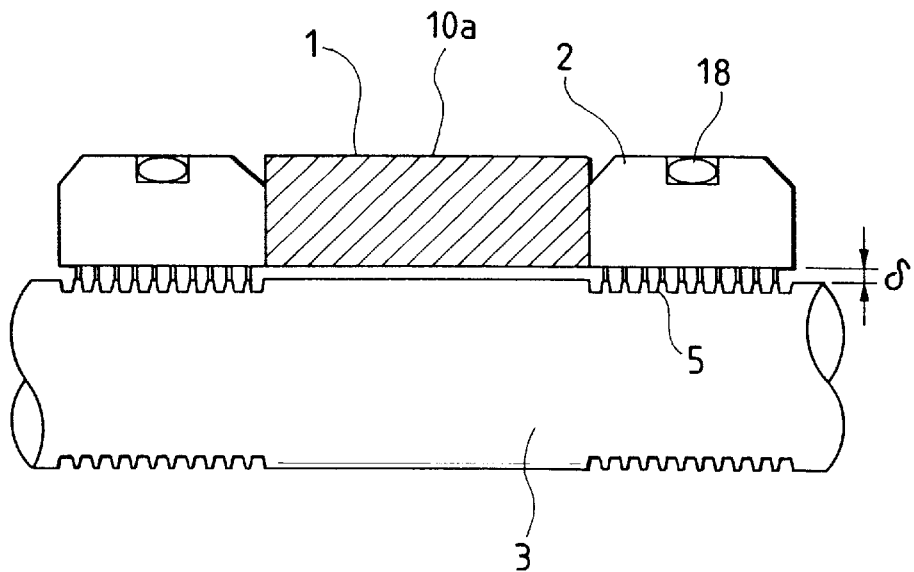
FIG. 4 is a view illustrating an essential portion of a prior art magnetic fluid sealing unit.

The magnet proof magnetic fluid sealing device shown in FIG. 1 is modified from a magnetic fluid sealing device 50 shown in FIG. 3 with the aim of improving the magnet-proof characteristic. That is to say, to magnetically shield a magnetic circuit portion constituting a magnetic fluid sealing unit 10 shown in FIG. 3 from an external magnetic field, a case 20 and a screw cap 11 shown in FIG. 3 are changed into a magnetic material made case 20A and a magnetic material made screw cap 11A shown in FIG. 1, respectively. With this modification, there can be obtained a structure that a screw portion 14 for locking the screw cap 11A is short-circuited, to thereby suppress occurrence of magnetic saturation.

Figure 9:
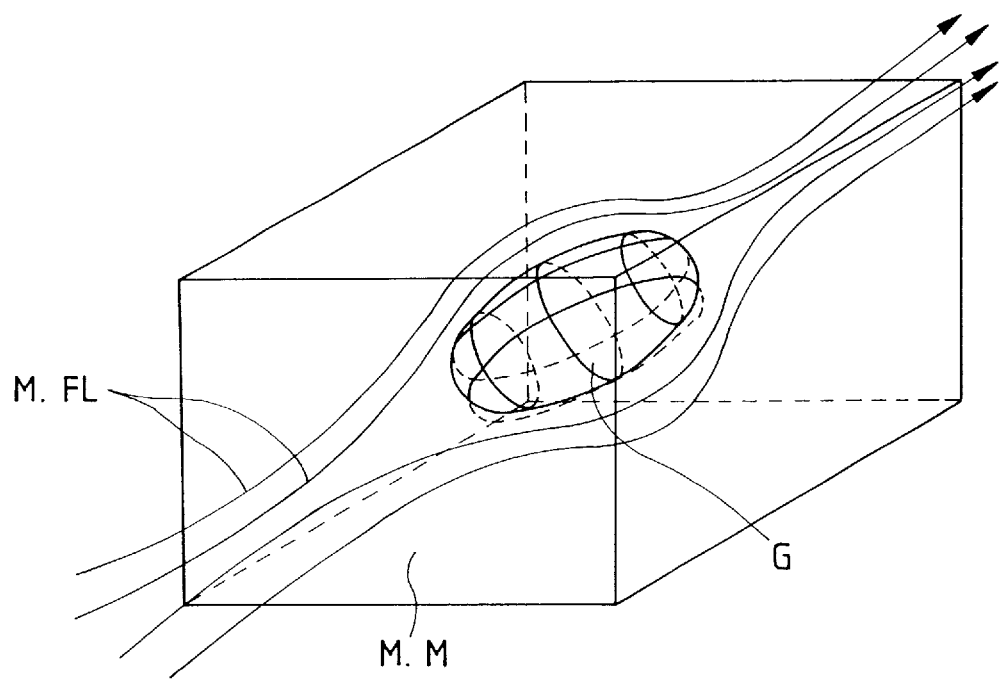
FIG. 9 is a view illustrating the principle of a magnetic shield mechanism.
Figure 10:
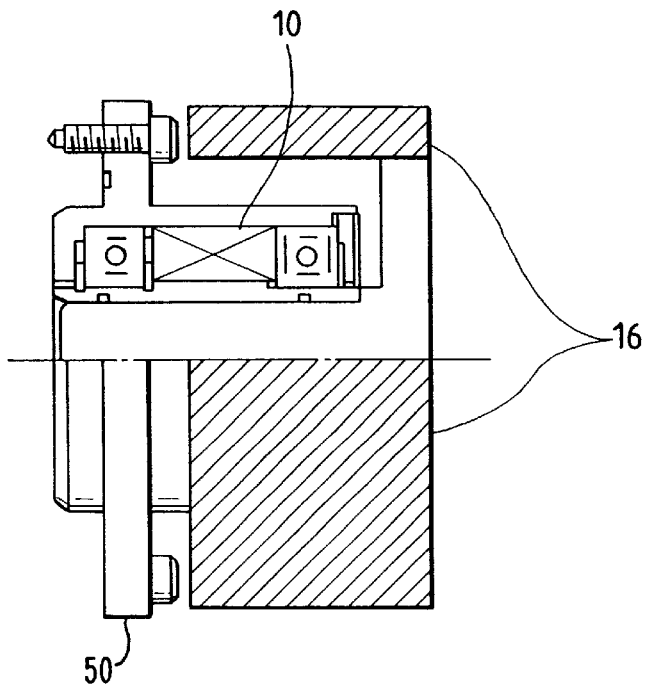
FIG. 10 is a view illustrating a magnetic fluid sealing device using the magnetic shield mechanism shown in FIG. 9.

The configuration of the above modified magnetic fluid sealing device is also effective to enhance the sealing function of the magnetic fluid sealing unit because a magnetic flux of an external magnetic field is not leaked into the magnetic material made case 20A and the magnetic material made screw cap 11A as is apparent from the principle of the magnetic shield mechanism shown in FIG. 9.

Figure 5:
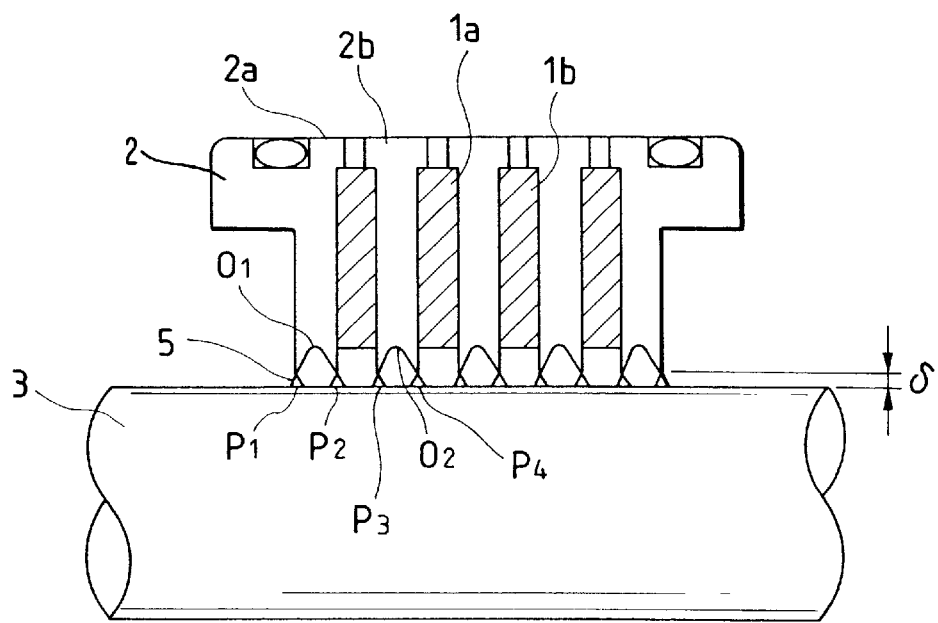
FIG. 5 is an enlarged view illustrating an essential portion of another prior art magnetic fluid sealing unit.
Figure 6:
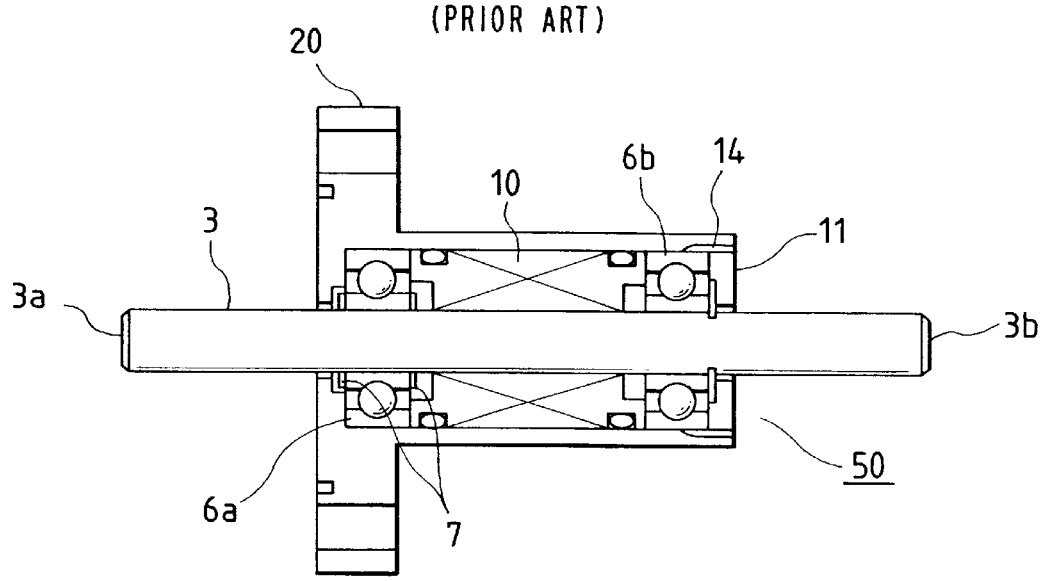
FIG. 6 is a view illustrating a magnetic fluid sealing device for a rotating machine, which uses the magnetic fluid sealing unit shown in FIG. 5.

The above modified magnetic fluid sealing device, however, has a problem yet. Mechanical contact portions between the case 20A and end portions, opposite to the shaft 3, of the magnetic pole pieces 2a and 2b (as shown enlarged in FIG. 5) are not regarded as equivalent to magnetic contact portions when the strength of the magnetic field of the mechanical contact portions becomes larger, with a result that there occurs magnetic saturation at the mechanical contact portions. For example, in an experiment in which the sealing function of the experimental apparatus shown in FIG. 7 using the magnet proof magnetic fluid sealing device shown in FIG. 1, it was expected to ensure a good sealing function against a very strong external magnetic field by the magnetic shield effect; however, actually, the sealing device loses the sealing function when an external magnetic field having a strength over a certain degree is applied to the sealing device.

Figure 11:
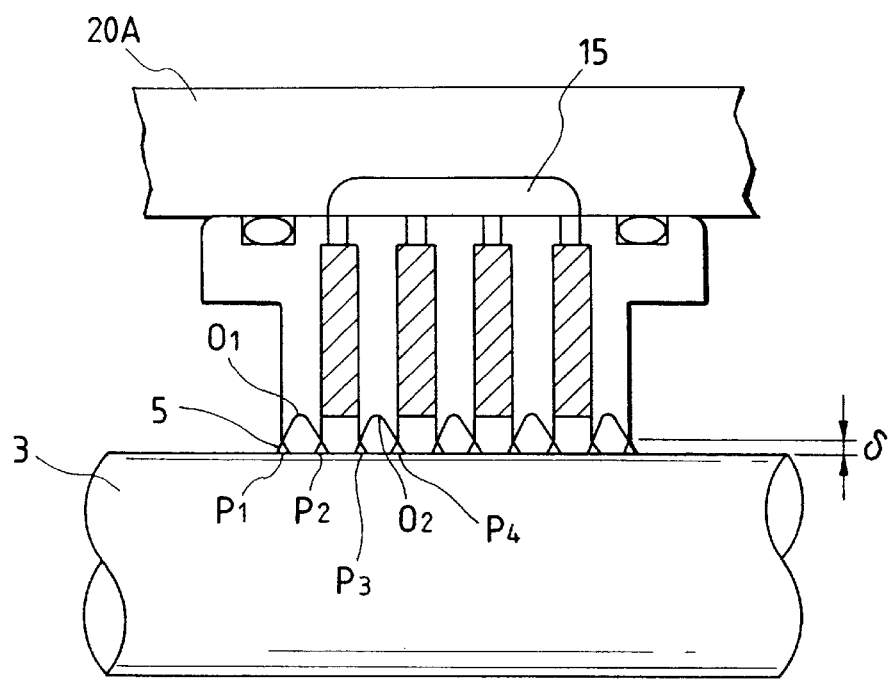
FIG. 11 is an enlarged view illustrating an essential portion of magnetic fluid sealing unit of FIG. 1.

To improve the above problem, as shown in FIG. 1, air gaps 15 (FIG. 11) each having a narrow width and a small depth are formed in the surface portions, being in contact with the case 20A, of the entire magnetic pole pieces 2 (which constitute the magnetic circuit of the magnetic fluid sealing unit 10) except for the surface portions, being in contact with O-rings 18, of those of the magnetic pole pieces 2 located at both the sides of the magnetic fluid sealing unit 10. While those of the magnetic pole pieces 2 having the contact surfaces with the O-rings 18 are in contact with the case 20A, the inner magnetic field constituting the magnetic circuit of the magnetic fluid sealing unit 10 is magnetically independent from an external magnetic field by the presence of the air gaps 15. As a result, the magnetic circuit of the magnetic fluid sealing unit 10 is separated from the external magnetic field.

Further, in the magnetic fluid sealing device 50 having the case 20A and the screw cap 11A each of which is made of a magnetic material, the thickness of a side wall portion 12, shown at the left end of FIG. 1, which is integrated with the case 20A, is made larger. With this configuration, since the magnetic resistance of the side wall portion 12 is small, the magnetic flux of the external magnetic field is less leaked into the inside of the magnetic fluid sealing device 50. As a result, the magnetic fluid sealing device 50 having such a configuration exhibits a high magnetic shield effect when being located in the external magnetic field generated from the electric magnet 100 shown in FIG. 7.

Next, a second embodiment of the present invention will be described with reference to FIG. 2. The second embodiment is intended to further improve the magnet proof sealing function of the magnet proof magnetic fluid sealing device according to the first embodiment.

In the first embodiment, at the right end portion of the magnet proof magnetic fluid sealing device, a magnetic resistance becomes higher at a portion between the case 20A and the magnetic fluid sealing portion 10 and the magnetic material made screw cap 21A for retaining the bearing 6b, that is, at the screw portion 14 for mounting the screw cap 11A to the case 20A. This is because at the screw portion 14, gaps exist between each thread ridge and thereby effective contact portions become short. As a result, when the sealing device is located in a strong magnetic field, there occurs magnetic saturation at the screw portion 14, resulting in a leaked magnetic flux thereat. This exerts adverse effect on the magnetic fluid 5 in the micro gaps δ between the magnetic pole pieces 2 and the shaft 3.

To solve the above problem, as shown in FIG. 2, a flange portion 13 is provided in such a manner as to cover the screw portion 14 at which the screw cap 11A is screwed in the case 20A.

With this configuration, the magnetic flux of the external magnetic field does not pass through the screw portion 14, but passes through the flange portion 13, to lower the magnetic resistance of the screw portion 14. This is effective to reduce the leaked magnetic flux, thereby preventing scattering of the magnetic fluid 5.

Figure 8:
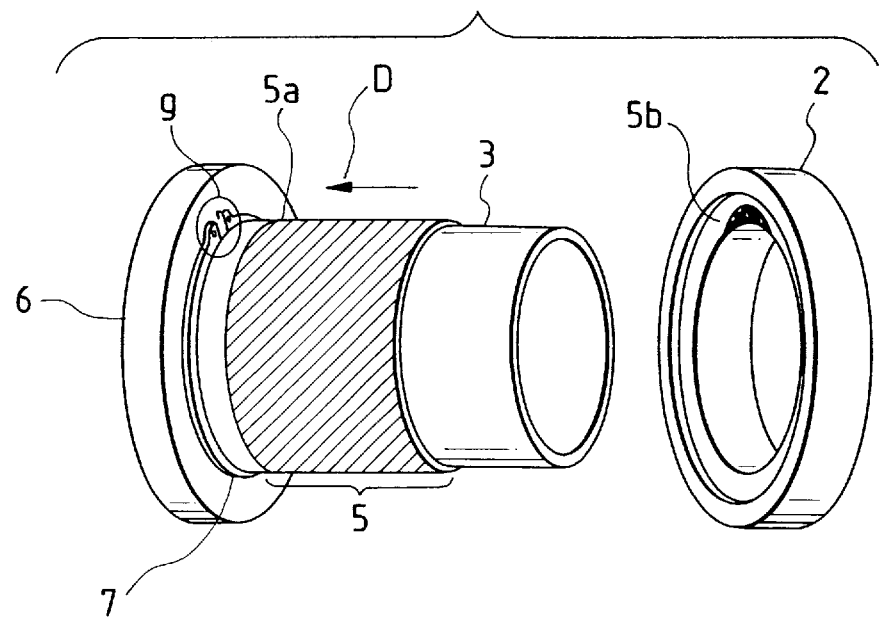
FIG. 8 is an exploded view of an essential portion of the magnetic fluid sealing device shown in FIG. 6.

Also, in the magnet proof magnetic fluid sealing device shown in FIG. 1, as shown in FIG. 8, since each of the bearings 6 and snap rings 7 around the magnetic circuit constituting the magnetic fluid sealing unit 10 is made of a magnetic material which is magnetized by an external magnetic field into a magnet. The leaked magnetic flux caused by such magnetization of the bearings 6 and snap rings 7 may attract the magnetic fluid 5 kept in the air gap g.

To solve the above problem, according to the second embodiment, as shown in FIG. 2, the bearing 6N is made of a ceramic material and the snap ring 7N is made of a non-magnetic material such as a stainless steel, to give independence to the magnetic circuit portion of the magnetic fluid sealing unit 10. With this configuration, the components around the magnetic circuit portion are less magnetized by the external magnetic field, to reduce the leaked magnetic flux, thereby preventing scattering of the magnetic fluid 5.

The ceramic bearing 6N in this embodiment is used not only to prevent, like a ceramic bearing used for a rotating type cathode-ray tube of an X-ray generator, occurrence of electric corrosion in which a potential difference caused between the case 20A and the rotating shaft 3 makes the bearing defective by annealing due to discharge and eventually make the use of the bearing impossible, but also to suppress the passing of the magnetic flux therethrough.

Figure 7:
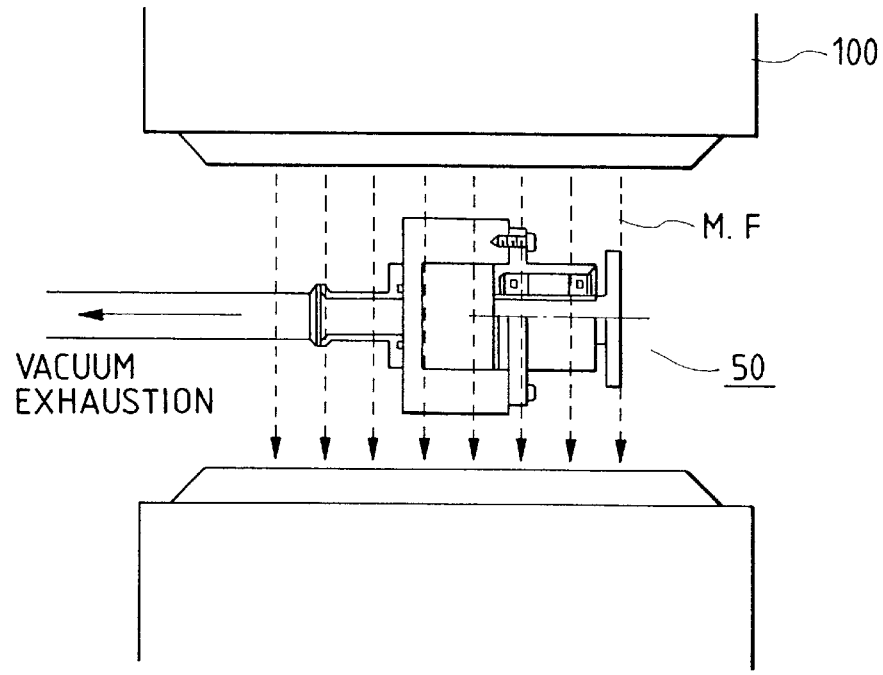
FIG. 7 is a view illustrating an experiment for examining the sealing function of the magnetic fluid sealing device shown in FIG. 6.

With these configurations, the degree of independence of the magnetic circuit of the magnetic fluid sealing device is increased, so that even when the external magnetic field is applied to the magnetic fluid sealing device in the direction shown in FIG. 7, the magnetic flux of the external magnetic field passes through the case 20A and the screw cap 11A, with a result that the magnetic flux flowing in the magnetic fluid circuit unit 10 becomes small by the magnetic shield effect.

The magnet proof magnetic fluid sealing device according to the present invention, which has the above configurations, can be effectively used for a bearing portion of a crystal lift apparatus for preparing a silicon single crystal. In the crystal lift apparatus, as described above, while oxygen regarded as one of impurities to be contained in a silicon single crystal is eluted from a crucible at high temperatures into molten silicon and oxygen thus eluted travels on the surface of a growing single crystal by thermal convection and is eventually diffused and absorbed in the single crystal, a strong external magnetic field is applied to the molten silicon to induce a current in the molten silicon thereby suitably suppressing the degree of the convection in the molten silicon. When the prior art magnetic fluid sealing device in which a magnetic field for attaining magnetic shielding is given by a magnet is used for the above crystal lift apparatus, it loses the sealing function by the strong external magnetic field quite different from the above internal magnetic field. On the contrary, the magnet proof magnetic fluid sealing device according to the present invention can be desirably used for the bearing portion of the crystal lift apparatus because the sealing device is configured, as described above, to reduce a leaked magnetic flux and prevent scattering of the magnetic fluid and hence to improve the magnet proof characteristic by changing the materials of the case and the bearing and slightly enlarging the dimension of the screw cap.

What is claimed is:

1. In a magnetic fluid sealing device comprising:
   a housing;
   a rotating shaft rotatable supported, in said housing, by bearings; and
   a magnet and magnetic pole pieces, which are arranged in such a manner as to encircle said rotating shaft with micro gaps therebetween;
   wherein a magnetic field formed by said magnet forms magnetic fluid films in said micro gaps to thereby magnetically seal a region between a vacuum region at one end of said rotating shaft and a high pressure region at the other end of the rotating shaft;
   the improvement wherein
     said housing and a mounting cap for fixing said magnetic fluid sealing portion and said bearings at specific positions in said housing are made of a magnetic material; and
     air gaps are provided in contact portions between said housing and end portions, on the opposed side to said shaft, of said magnetic pole pieces.

2. A magnetic fluid sealing device according to claim 1, wherein a flange portion is provided on said mounting cap in such a manner as to extend in the direction perpendicular to the direction of an external magnetic field.

3. A magnetic fluid sealing device according to claim 2, wherein said bearing and a fixture for locking said bearing are each made of a non-magnetic material.

4. A magnetic fluid sealing device according to claim 3, wherein a side wall, on the opposed side to the side on which said mounting cap is locked, of said housing has a thickness sufficient to make the magnetic resistance thereof small.

5. A magnetic fluid sealing device according to claim 1, wherein said bearing and a fixture for locking said bearing are each made from a non-magnetic material.

6. A magnetic fluid sealing device according to claim 1, wherein a side wall, on the opposed side to the side on which said mounting cap is locked, of said housing is thickened to make the magnetic resistance thereof small.

7. A magnetic fluid sealing device, comprising:

a rotating shaft rotatably supported in a housing, by at least a bearing;

a magnet and magnetic pole pieces arranged in such a manner as to encircle said rotating shaft with micro gaps therebetween;

a magnetic fluid sealing portion including said magnet and magnetic pole pieces forming fluid films in said micro gaps by a magnetic field formed by said magnet, thereby magnetically sealing with a region between a vacuum region at one end of said rotating shaft and a high pressure region at the other end of the rotating shaft; and a mounting cap for containing said magnetic fluid sealing portion, and part of said rotating shaft under said magnetic fluid sealing portion, in contact with said housing;

wherein said housing and said mounting cap are made of magnetic material, and said housing in contact with said mounting cap has a magnetic resistance which is sufficiently small so as to shield the magnetic fluid sealing device from an external magnetic field.

8. A magnetic fluid sealing device according to claim 7, wherein a flange portion is provided on said mounting cap in such a manner as to extend in the direction perpendicular to the direction of the external magnetic field.

9. A magnetic fluid sealing device according to claim 7, wherein said bearing and a fixture for locking said bearing are each made of a non-magnetic material.

10. A magnetic fluid sealing device according to claim 7, wherein a side wall, on the opposed side to the side on which said mounting cap is locked, of said housing has a thinkness sufficient to make the magnetic resistance thereof small.

* * * * *